US008750904B2

(12) United States Patent
Mader et al.

(10) Patent No.: US 8,750,904 B2
(45) Date of Patent: *Jun. 10, 2014

(54) DETECTING, IDENTIFYING, REPORTING AND DISCOURAGING UNSAFE DEVICE USE WITHIN A VEHICLE OR OTHER TRANSPORT

(71) Applicant: Guardity Technologies, Inc., Plano, TX (US)

(72) Inventors: Joseph Thomas Mader, Plano, TX (US); Thomas Edward Mader, Plano, TX (US); Russell Carl McKown, Richardson, TX (US)

(73) Assignee: Guardity Technologies, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/871,711

(22) Filed: Apr. 26, 2013

(65) Prior Publication Data

US 2013/0238184 A1 Sep. 12, 2013

Related U.S. Application Data

(63) Continuation of application No. 13/267,034, filed on Oct. 6, 2011, now Pat. No. 8,442,558.

(60) Provisional application No. 61/390,697, filed on Oct. 7, 2010.

(51) Int. Cl.
*H04W 24/00* (2009.01)

(52) U.S. Cl.
USPC ..................... 455/456.4; 455/569.2

(58) Field of Classification Search
CPC ............................. H04K 3/415; H04M 1/6075
USPC ................. 455/1, 456.4, 456.3, 456.6, 422.1, 455/456.1, 569.2
See application file for complete search history.

(56) References Cited

U.S. PATENT DOCUMENTS

| | | | |
|---|---|---|---|
| 7,181,229 B2 * | 2/2007 | Singh et al. | 455/456.4 |
| 7,738,831 B2 * | 6/2010 | Nath et al. | 455/1 |
| 7,966,025 B1 * | 6/2011 | O'Neil | 455/456.4 |
| 8,044,794 B2 * | 10/2011 | Chauncey et al. | 340/539.11 |
| 8,126,389 B2 * | 2/2012 | Brown et al. | 455/1 |
| 8,160,560 B2 * | 4/2012 | Geyer et al. | 455/418 |
| 8,212,661 B2 * | 7/2012 | Shuster | 340/438 |
| 8,275,395 B2 * | 9/2012 | Howarter et al. | 455/456.4 |
| 2009/0215466 A1 * | 8/2009 | Ahl et al. | 455/456.1 |
| 2012/0252350 A1 * | 10/2012 | Steinmetz et al. | 455/1 |
| 2013/0238184 A1 * | 9/2013 | Mader et al. | 701/31.5 |

* cited by examiner

*Primary Examiner* — Sonny Trinh

(57) ABSTRACT

A system, method and computer readable medium comprised of in-vehicle passive monitoring and information management system elements which together detect, identify, report and discourage unsafe wireless device use by the operator of a vehicle. An in-vehicle monitoring device determines the vehicle's operational state and location, identifies wireless device transmitter emissions within the vehicle and communicates to a remote information management system in real-time using a wireless network, or after-the-fact, using a locally-installed software version of the information management system. The information management system collects information retrieved from in-vehicle devices and correlates this information with other database information to provide users with timely alerts, tracking, and records of unsafe wireless device use.

20 Claims, 11 Drawing Sheets

Example In-dashboard Placement of In-Vehicle Device

Example In-Vehicle Device Attached Directly to OBDII Connector

Example IMS Processes for Emitter Analysis without Authorized Cellphone Records

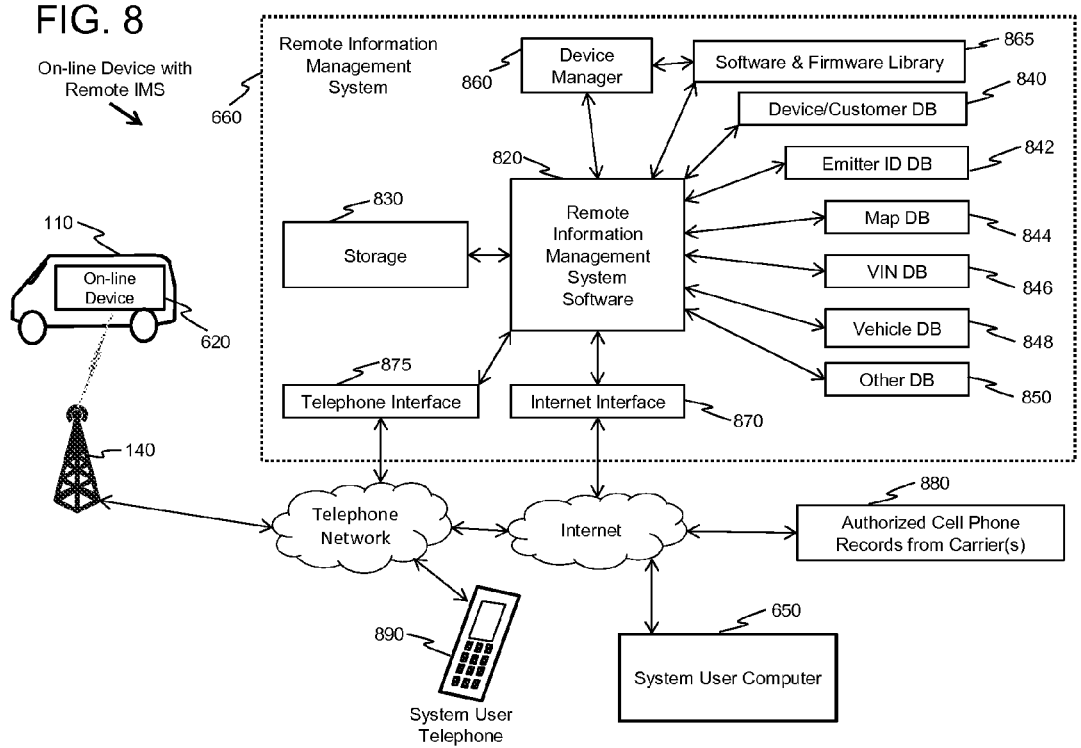

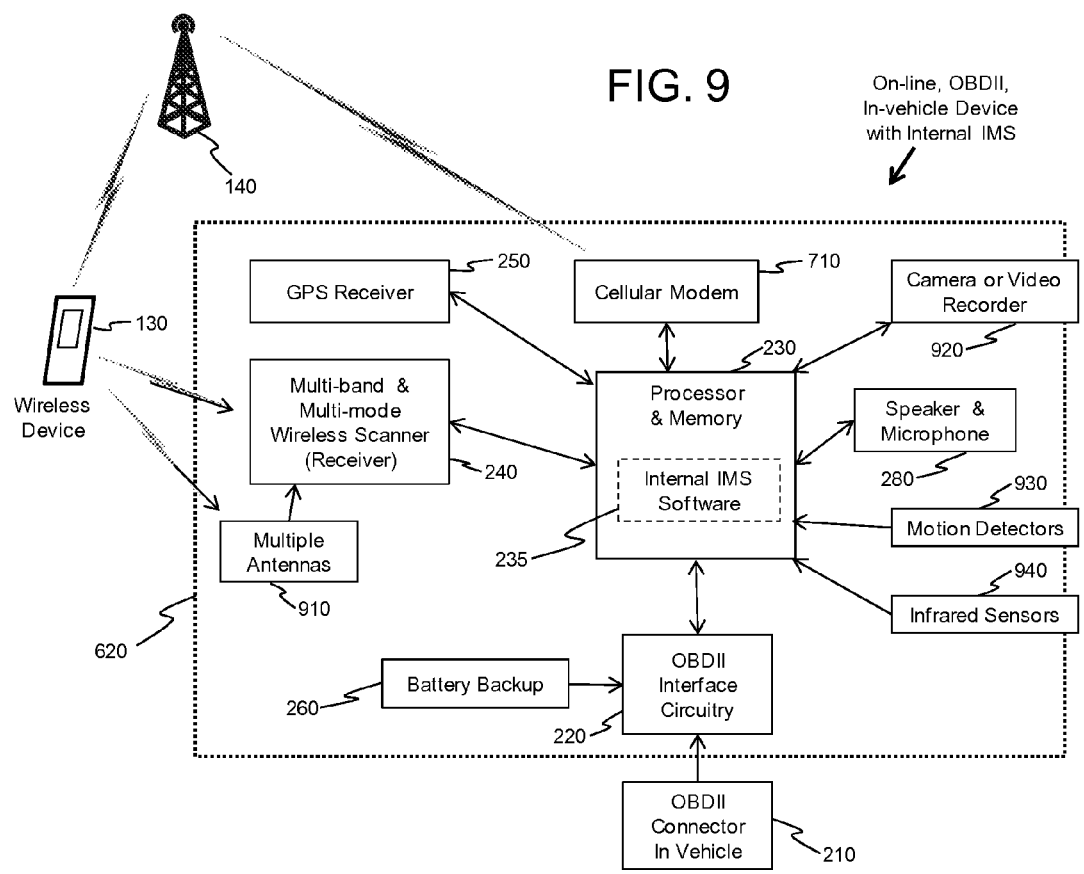

DETECTING, IDENTIFYING, REPORTING AND DISCOURAGING UNSAFE DEVICE USE WITHIN A VEHICLE OR OTHER TRANSPORT

CROSS-REFERENCES

This application is a continuation of U.S. application Ser. No. 13/267,034, filed Oct. 6, 2011, entitled "DETECTING, IDENTIFYING, REPORTING AND DISCOURAGING UNSAFE DEVICE USE WITHIN A VEHICLE OR OTHER TRANSPORT", now issued U.S. Pat. No. 8,442,558, issued on May 14, 2013, which in turn claims the benefit of U.S. Provisional Application No. 61/390,697, filed Oct. 7, 2010, entitled "DETECTING, IDENTIFYING, REPORTING AND DISCOURAGING UNSAFE DEVICE USE WITHIN A VEHICLE OR OTHER TRANSPORT", the entire contents of which are hereby incorporated by reference.

FIELD

The present invention relates to communication devices, and more particularly, relates to the detection, identification, reporting, and discouragement of unsafe operation of wireless devices within a vehicle or other transport.

BACKGROUND

The proliferation of wireless devices has created a widely recognized distraction problem for all types of transport operators. Transport operators are responsible for the safe operation of their transport, such as cars, trucks, buses, trains, motorcycles, boats, aircraft, etc. For convenience and readability, all transport entities will be referred to as 'vehicles" herein. The 'cellphone distraction' has proven to seriously impair users' ability to safely operate their vehicles. According to the Insurance Institute for Highway Safety (IIHS), as reported in their Jul. 16, 2005 '*Status Report*', operator distractions are proven to increase accident rates by over 400%, and according to their September, 2010 Traffic Safety Facts '*Research Note*', the number one source of operator distraction is cellphone use/texting. According to the National Highway Traffic Safety Administration's (NHTSA) September 2009 Traffic Safety Facts Research Note entitled, '*An Examination of Driver Distraction as Recorded in NHTSA Databases*', in 2008 operator distraction was determined to be the primary cause of auto accidents resulting in over 5,870 deaths and 515,000 injuries. At over $120 B annually, these fatality/injury accidents represent the highest per incident liability claims cost for auto insurers.

The use of wireless devices such as phones, data cards, tablet PCs, and netbooks has exploded over the past several years. In the United States, these devices commonly utilize wireless air interface technologies such as CDMA, GSM, WCDMA/HSPA, LTE, Bluetooth, WiFi and WiMax. As the size of wireless devices shrink and their functionality increases, they lure more and more individuals into using them to talk, message, watch videos, and play games while operating a vehicle. Although tempting, the use of these devices and applications while operating a vehicle has proven highly distracting and in many cases, injurious or lethal. According to the Governors Highway Safety Association (GHSA) website, "Driver inattention is a leading factor in many crashes, and cellphone use and texting are some of the most common driver distractions. While more and more states and localities are banning specific distractions, GHSA's message to all drivers is: don't use cellphones or other electronic devices while driving, regardless of the current law."

A September 2009 study by the Virginia Tech Transportation Institute Center for Truck and Bus Safety entitled, 'Driver Distraction in Commercial Vehicle Operations', discovered that drivers of heavy vehicles and trucks were 5.9 times more likely to crash or nearly-crash when dialing their cellphones. These same drivers were over 23.2 times more likely to crash or nearly-crash when text messaging while driving.

Most states, and many municipalities, have already enacted laws to help curb vehicle operator distractions caused by wireless devices. Many states recognized the most dangerous combinations of wireless device use by inexperienced drivers, or by distracted drivers within a school zone, and have enacted restrictions accordingly. Several states now prohibit hand-held cellphone use altogether while driving, and a majority of states now ban text messaging while driving. Unfortunately, these laws have proven difficult to enforce, and drivers have demonstrated minimal compliance. As a result, the IIHS reported in the Sep. 28, 2010 issue of their 'Status Report', that these bans have had no overall effect on accident rates.

Hands-free adapters have proven ineffective at mitigating the distraction a vehicle operator experiences while using a wireless device. Recent research by the NHTSA, as reported in their July, 2003 report, Using Wireless Communication Devices While Driving, demonstrates no difference in the level of driver distraction between hands-free operation of a cellphone and hand-held operation of a cellphone.

Automobile and truck drivers are not the only vehicle operators subject to the grave results of wireless device distraction. On Sep. 12, 2008, a Union Pacific freight train and a Metrolink commuter train collided head-on in the Chatsworth district of Los Angeles, Calif., resulting in 25 deaths and 135 injuries. The NTSB faulted the engineer of the Metrolink for the collision, concluding that he was distracted with sending text messages while operating the locomotive. In May of 2008, and again in May of 2009, collisions occurred on the Massachusetts Bay Transportation Authority streetcar system. Both collisions resulted from distracted operators using their cellphones. These two accidents resulted in serious passenger injuries and one death.

The dangers and costs associated with unsafe wireless device use by the operator of a vehicle are well researched and documented. Several solutions exist to address this problem. Their effectiveness however has been severely limited by major shortcomings. Currently existing solutions may be classified into three categories: 1) in-vehicle wireless device jammers; 2) wireless device software applications and 3) combination in-vehicle device and wireless device software applications.

One solution to the unsafe wireless device use by the operator of a vehicle problem is the use of a highly discrete short-range wireless device jammer. These devices exist with varying degrees of sophistication, for example the Angel MP and Txtstopper devices, but all operate through the transmission of radio frequencies intended to either cancel or drown-out valid radio transmissions. Unfortunately, this active aspect of all jamming solutions entails undesirable side effects. Jamming may interfere with other wireless devices, such as those in adjacent areas. Additionally, jamming devices may "leak", interfering with frequencies outside the range of targeted wireless devices. This can adversely impact a broad range of radio frequency (RF) devices ranging from garage door openers to medical equipment. As a result, the FCC banned all forms of jamming in the 1934 Telecommunications Act (SEC. 333. [47 U.C.S. 333]), including wireless devices. This Act states that "No person shall willfully or maliciously interfere with or cause interference to any radio communications of any station licensed or authorized by or under this Act or operated by the United States Government". This Act also bans the manufacture, importation, sale or offer for sale, including advertising, of devices designed to block or jam wireless transmissions. In summary, this entire genre of solutions is currently illegal in the US, as well as most other countries.

The wireless device software applications solution category requires the installation and use of a software application on the targeted wireless device. Consequently, it only works for those wireless devices on which it is installed. For example, these applications deactivate certain capabilities of the installed phone when the phone is identified as moving beyond a specific speed. The method for determining device speed varies, but usually utilizes the phone's GPS interface, wireless network triangulation, or other analysis of the device's RF signal characteristics. These products, for example the ZoomSafer, iZUP and Textecution software, have several serious shortcomings. First, each vendor's software supports only a relatively small number of wireless devices. Second, since the software resides on the wireless device, it can be disabled or overcome by the user. Third, these products only recognize device speed, not whether it is being used by the operator of a vehicle. Thus, it will disable the wireless device in circumstances when it is unnecessary, such as when the user is riding on a bus, or as a passenger in the vehicle. Additionally, these products can impair safety. Some allow the user to disable the application's blocking by entering a specific code. Others simply will not allow use of the wireless device until it has come to a stop. The first approach creates additional distraction to an errant user who attempts to disable blocking while operating a vehicle. The latter can prevent legitimate use of the device in an emergency situation. Finally, these products do nothing to prevent an operator from unsafely using another wireless device on which the application software is not installed.

The combination in-vehicle device and wireless device application solutions, for example CellControl, largely resemble the software-only applications, but with two improvements. The first improvement utilizes an in-vehicle device that enables the software application to confirm the wireless device's location within a specific vehicle. This eliminates the unwarranted blocking concerns suffered by the software-only solutions. The second improvement of this solution is that vehicle speed is acquired from the vehicle's monitoring systems, as opposed to relying on the wireless device or wireless network. Although these solutions offer improvements over the software-only version, they still suffer from the fatal flaws of the software-only versions. More specifically, these solutions only work on those devices on which they are installed, limited population of supported wireless devices, may be overcome or disabled by user, may impair safety due to blocking of non-911 emergency calls, and offer no protection against the unsafe use of unequipped wireless devices.

Any solution that blocks or disables a wireless device functionally, or otherwise requires software on that device, is either ineffective, unsafe, or illegal. What is needed is an ability to detect, identify, report, and discourage unsafe wireless device use by the operator of a vehicle through a passive monitoring solution that is legal, safe, and effective.

SUMMARY

The present invention provides a system, method and computer readable medium to discourage unsafe wireless device use by the operator of a vehicle through an in-vehicle device and a software-based information management system (IMS) that is typically external to the vehicle or device, legal, safe, and effective. Potential users of this system (herein referred to as 'system users'), include vehicle owners, fleet operators, parents of operators, supervisors of operators, insurance companies, law enforcement personnel, and others. The system users are interested in discouraging or monitoring unsafe wireless device use within specific vehicles. Since the present invention does not impair or prevent any wireless device use, it has the advantage of eliminating the safety, liability, and legal concerns that are associated with any attempt to force use prevention.

The in-vehicle device determines the vehicle's operational state through a combination of acceleration, speed, and other vehicle parameters. This device also passively detects and identifies wireless device transmitter emissions within the vehicle while the vehicle is in operation and characterizes potentially unsafe wireless device use. The device records this data into memory, along with other parameters, for transfer to the information management system which is a software application that may reside on a local computer or remote server. The information management system analyzes the data recorded by the in-vehicle devices, correlating the in-vehicle data with other database information to provide the system users with alerts, tracking, and records of unsafe wireless device use.

Certain embodiments of the present invention may have further advantages because they gather valuable vehicle use data such as longitudinal and lateral acceleration, yaw and roll, speed, Vehicle Identification Number (VIN), engine manifold pressure, throttle position, engine revolutions per-minute (RPM), ignition status, battery voltage, airbag state, anti-lock braking system state, in-vehicle atmospheric-pressure changes, in-vehicle audio, seat-belt status, vehicle location, route history, en route and stop times, and vehicle trouble codes. This data enables correlation of unsafe wireless device use with criteria such as school-zone crossings, speeding, reckless driving, hard-braking, or even a crash event.

In 'off-line' embodiments of the present invention, the system has an in-vehicle device that is equipped with a means of transferring computer readable files that provides for the post-vehicle-operation transfer of information between the in-vehicle device and the information management system that is installed on the system user's computer. This allows subsequent, post-vehicle-operation analysis, as described below, of the in-vehicle device data by the user, with the analysis including alerts of unsafe wireless device use.

In 'on-line' embodiments of the present invention, the system has an in-vehicle device that is equipped with a network-enabled wireless interface for real-time communication with a remote information management system. In an on-line embodiment, system users connect to the information management system remotely, for example using a web browser or network-enabled application to review the monitored vehicle's location, status, and activity history. A network-enabled application, for example, allows system users to use a small hand-held wireless phone, PDA, or similar device to monitor in-vehicle device equipped vehicles, receive customizable alerts, notification, status, etc. The remote information management system can provide real-time vehicle tracking, wireless device use data, alerts, and monitoring capabilities to the system users. The system users can also receive real-time email, text, or voice alerts per their account configuration.

On-Board Diagnostics version 2 (OBDII) was made mandatory by the United States Environmental Protection Agency (EPA) on all passenger cars and light trucks sold in America since 1996. OBDII is a standard that specifies a type of diagnostic connector, its location, pin-out, signaling protocols, and messaging format. OBDII provides for two-way communication with a vehicle's Electronic Control Unit (ECU) such that extensive vehicle data may be accessed. In 'OBDII' embodiments of the present invention, the system upgrades OBDII-compliant automobiles and trucks with the in-vehicle device. In the OBDII embodiments, the in-vehicle device is simply plugged into the vehicle's OBDII connector. The standard OBDII connector provides 12 volt DC power as well as numerous vehicle parameters and trouble codes. In addition to OBDII, other standards for a serial communications interface to a vehicle's ECUs currently exist or are under development. For example, the Society of Automotive Engineers (SAE) J1939 and J1708 standards are currently in use for heavy duty vehicles, while development is underway for HDOBD (heavy duty OBD) and wireless OBD. For convenience and readability, all OBDII references herein shall be understood to include any standard interface to the vehicle's ECU.

In 'non-OBDII' embodiments of the present invention, the system upgrades non-OBDII compliant vehicles with the in-vehicle device. Many pre-1996 passenger vehicles, as well as most heavy trucks, busses, trains, boats, and other vehicles do not incorporate an OBDII interface. In these instances, the installation of the in-vehicle device requires additional time and effort as its individual wires must be spliced into the vehicle's electrical system. The configuration of the information management system user account on non-OBDII compliant vehicles also requires additional effort as the Vehicle Information Number (VIN) is either not available, or would not automatically be retrieved by the in-vehicle device. Other than the additional installation and configuration effort, the non-OBDII embodiments are materially similar to the above OBDII embodiments.

In 'factory install' embodiments of the present invention, the system involves a factory installation of the in-vehicle device in new automobiles, trucks or other vehicles. The factory install embodiments are materially similar to the above embodiments, except for several key advantages. First, the in-vehicle device can be fully integrated into the vehicle such that no additional "boxes" are needed. Removal or disablement of the in-vehicle device would be very difficult. Additionally, much more flexibility can be afforded to antenna placement options to improve RF emissions-location performance and improve the signal quality from the GPS and wireless radio networks. Additionally, more robust and effective integration with the vehicle's radio, electronic control systems, and other functions can entail a better user experience and greater depth of system capabilities.

Note that the above OBDII, non-OBDII, and factory install embodiments of the present invention refer to different embodiments of the in-vehicle device whereas the off-line and on-line embodiments refer to different embodiments of the connectivity between the in-vehicle device and the information management system which effects the means that system users access the information. It follows that a system embodiment of the present invention may be further described, for example, as an OBDII/on-line embodiment to refer to the in-vehicle device being connected to the vehicle's OBDII port and the system user accessing the information management system via the Internet. Another category of implementation is whether the IMS is external to the in-vehicle device (as described above) or internal to the in-vehicle device. For example, an in-vehicle device with an internal, on-line IMS (software module 235 in FIG. 9) could send email text alerts directly to a system user supervisor or parent. An in-vehicle device with an internal, off-line IMS could store the email text messages and alerts until the supervisor or parent establishes a local data connection to the in-vehicle device, at which time the messages and alerts would be transferred to the system user supervisor or parent.

Also note that all of the above embodiments are available for different use-cases. An interesting example of a use-case is the law enforcement/accident investigation use-case. Some states may mandate or incentivize the installation and use of this system within vehicles. For example, they may require that an in-vehicle device be installed in the primary vehicle of anyone already convicted of using a wireless-device while driving, or a reckless driving offense. Alternatively, they may offer reduced 'points' for a particular offense, or an overall 'points' credits for participating drivers. In the event an equipped vehicle is involved in a crash, the police can easily determine if the in-vehicle device was functioning at the time of the crash, and whether or not it had identified any wireless device use at the time of the accident.

BRIEF DESCRIPTION OF THE DRAWINGS

FIG. 8 depicts a reference example of the remote IMS for an on-line embodiment of the invention; and FIG. 9 depicts a reference example of an on-line OBDII in-vehicle device with internal IMS and additional sensors embodiment of the invention.

DETAILED DESCRIPTION

The present invention provides a system, method and computer readable medium to detect, identify, report and discourage unsafe wireless device use by the operator of a vehicle through an in-vehicle device and a software-based information management system.

Figure 1A:
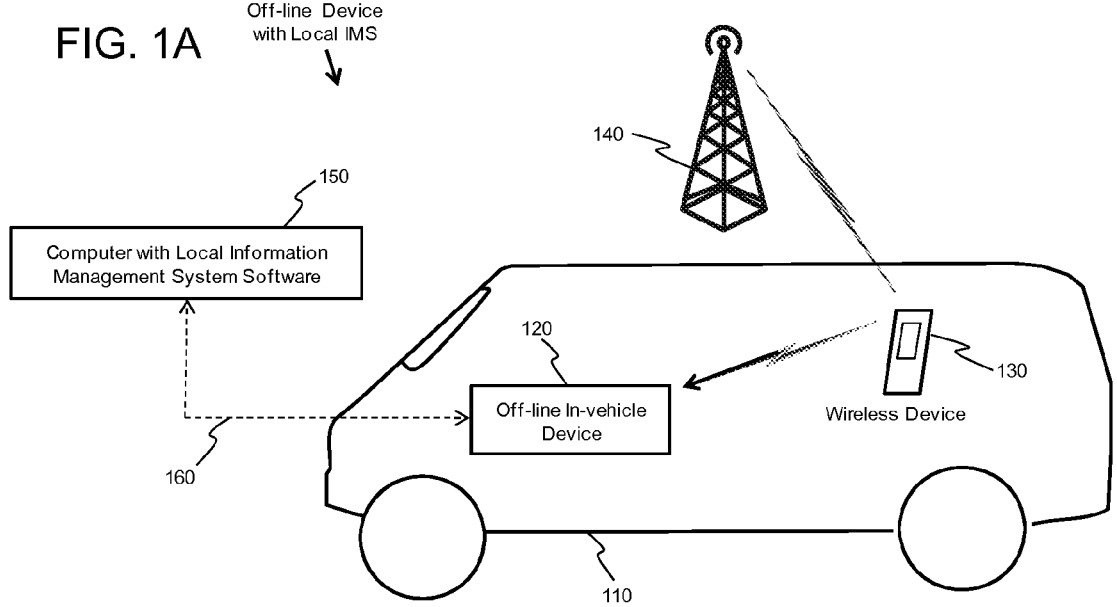
FIG. 1A depicts a diagram of an off-line device with local IMS embodiment of the invention to discourage unsafe wireless device use by the operator of a vehicle.

FIG. 1A shows a diagram of one embodiment of the invention in which a vehicle 110 contains an in-vehicle device 120 and a wireless device 130 that utilizes a wireless technology, for example CDMA, GSM, WCDMA/HSPA, LTE, Bluetooth, WiFi and WiMax, and is of interest here as a potential distraction to the vehicle operator. In this off-line system embodiment, the in-vehicle device 120 is occasionally locally connected 160 to a system user's computer with local information management software installed 150. The in-vehicle device 120 is capable of detecting the RF emissions of the wireless device 130 using a wireless device scanner/receiver and is capable of detecting motion of the vehicle 110, for example, using data from either the GPS receiver or the OBDII interface. The in-vehicle device 120 is also capable of determining whether the wireless device 130 is in active use, i.e., transferring user data to a wireless network 140, or not, based upon transmitter characterization, including for example, the duration of transmission.

In the off-line system embodiment of FIG. 1A, there is a post-vehicle-operation transfer of information from the in-vehicle device 120 to the system user's computer 150 with the local information management system software installed. Execution of this software provides the system users with post-vehicle-operation analysis of the previously logged wireless device activity data, with the analysis including alerts of unsafe wireless device use.

Figure 1B:
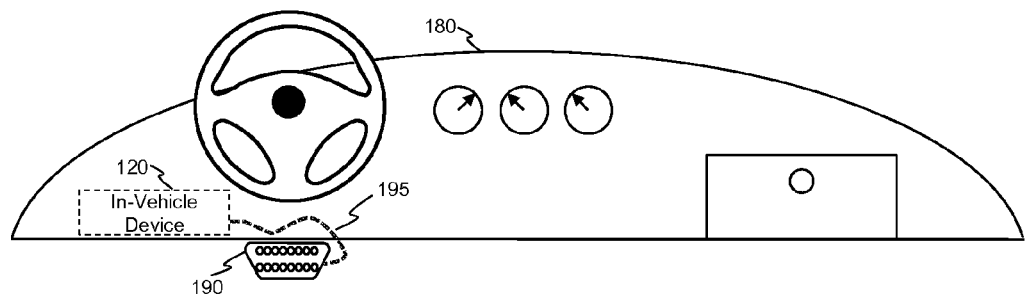
FIG. 1B depicts a diagram of an example in-dashboard placement of the in-vehicle device of the present invention.
Figure 1C:
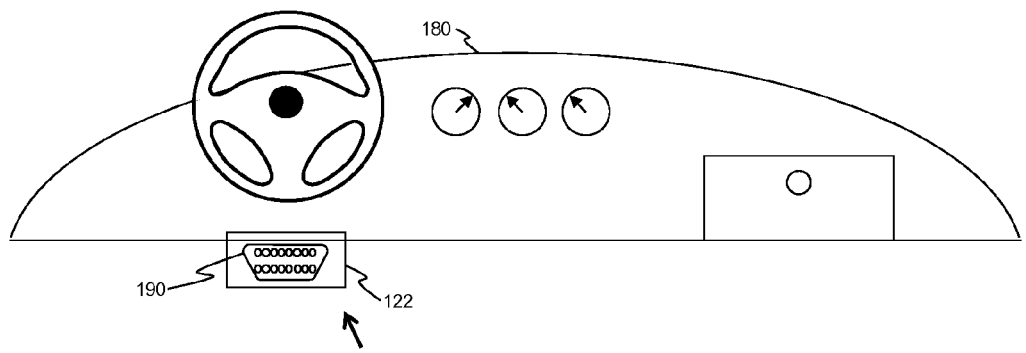
FIG. 1C depicts a diagram of an example in-vehicle device attached directly to OBDII connector.

FIG. 1B shows an example in-dashboard placement of the in-vehicle device 120 of the invention. In this example, an OBDII implementation of the in-vehicle device 120 is securely attached inside/up-in the vehicle dashboard using a strong-bonding double sided tape, hook and loop fastener, form fitting cradle, securing ties, or some similarly convenient binding technique that allows the device to be firmly attached to a bracket, panel, fixture, etc., up-inside the dashboard in the general vicinity of the OBDII connector 190. A short, and preferably removable, cable 195 is then used to connect the in-vehicle device 120 to the OBDII connector. Another embodiment of the in-vehicle device plugs directly into the OBDII connector, eliminating the need for the connecting cable 195. FIG. 1C illustrates this no-cable embodiment; the in-vehicle device 122 contains an OBDII connector that mates directly with the vehicle OBDII connector 190. If the vehicle does not contain an OBDII connector, the installation is the same with the exception that the connection is to the most convenient +12 VDC, ground, and any other applicable electrical terminals or wires, for example a Pre-OBDII standard diagnostic connector or speed sensor. In either case, explicit installation instructions can be provided for any make and model of vehicle so that ordinary vehicle owners may install the in-vehicle device into their vehicle. Other in-vehicle device types of installations exist that can obviously be performed by the ordinary vehicle owner within the scope of the present invention. For example, the in-vehicle device can be placed in a glove compartment or console, or on the floor, or under a seat, or in a compartment in a door.

Figure 2:
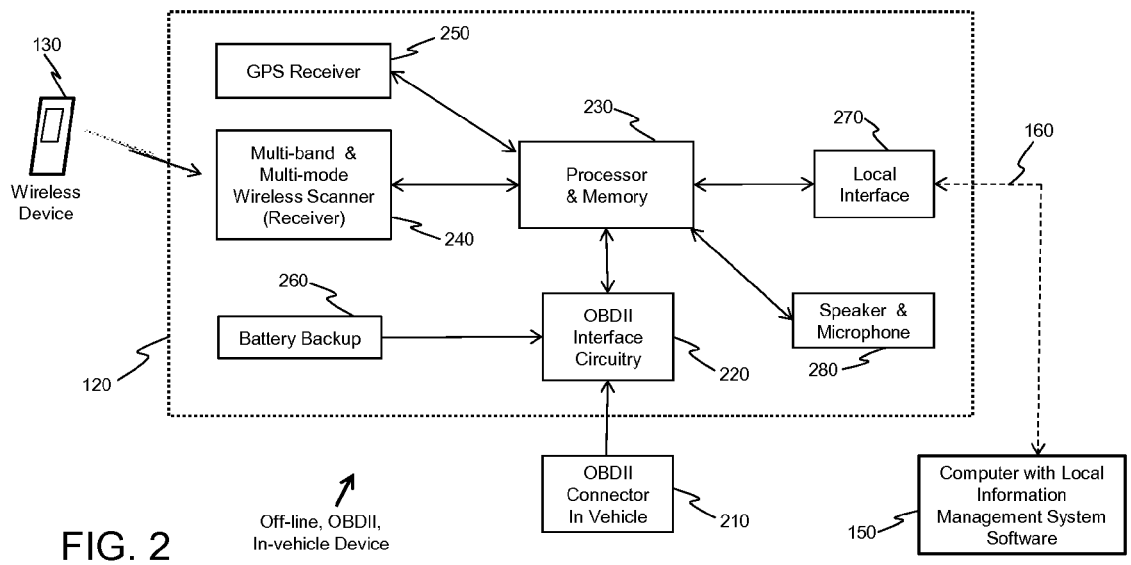
FIG. 2 depicts a reference example of an in-vehicle device for an OBDII, off-line embodiment of the invention.

FIG. 2 shows a block diagram of an example OBDII embodiment of the in-vehicle device 120 for the off-line system embodiment of the present invention that is depicted in FIG. 1A. In this embodiment, the in-vehicle device 120 plugs into the vehicle's OBDII connector/interface/port 210 which provides both 12 volt DC power and information-containing electrical signals to the device's OBDII interface circuitry 220. The information-containing electrical signals in the OBDII port 210 continuously report numerous vehicle parameters such as speed, engine RPM and airbag deployment; as well as the vehicle's identification in the form of its Vehicle Information Number (VIN). The OBDII interface circuitry 220 distributes the power as required and also provides the OBDII-derived vehicle parameter data to the device's processor and memory module 230. By law, the OBDII connector is easy to access, typically located within 24 inches of the vehicle's steering wheel and, since 1996, is mandatory on all passenger cars and light trucks sold in America. The OBDII embodiment of the in-vehicle device 120 of the present invention has a standard OBDII connector (currently a 16-pin, 2×8, J1962 connector) which allows any individual to connect the device to their vehicle's OBDII port 210 within minutes, given simple vehicle-specific instructions. In the future, the present invention may utilize a wireless OBDII technology if made available.

Referring to FIG. 2, in the present invention the in-vehicle device 120 contains a processor and memory module 230 which provides control to and receives data from a multi-band and multi-mode wireless scanner receiver 240 so that together they can detect the presence of in-vehicle wireless transmissions. The list of wireless uplink frequencies that require scanning for possible in-vehicle transmissions are determined by the country the vehicle is in and the available wireless networks in that country. Each wireless network operates on purchased/assigned radio frequencies and each frequency utilizes a standardized wireless technology that is technically referred to as an 'air interface'. For example, in the United States the available wireless air interfaces include CDMA, GSM, WCDMA/HSPA, LTE, WiFi, and WiMax. Both the wireless device 130 and the wireless scanner receiver 240 operate in a different 'mode' for each of these air interfaces. For example, certain wireless devices on certain networks support both a GSM mode and a WCDMA/HSPA mode. The multi-band and multi-mode wireless scanner receiver 240 is capable of scanning all of the available wireless-uplink frequencies and detecting the presence and mode of any in-vehicle wireless transmissions on those frequencies. These scanning and detection functions can be performed with known radio signal processing techniques that include, for example, an antenna, a low-noise amplifier, RF-tuning and down-conversion, filtering, and square-law detection.

The wireless scanner receiver 240 in conjunction with the processor and memory module 230 can provide precision estimates of certain wireless transmission parameters, including center frequency and symbol time interval, which together provide an emitter 'fingerprint' identifying the in-vehicle wireless transmissions as originating from a particular source or a number of different sources within the vehicle. The precision estimates for center frequency and symbol time interval are obtained by integrating or averaging raw estimates as is known, for example as described by J. G. Proakis in Digital Communications, McGraw-Hill 2000. This enables subsequent observations of wireless RF emissions as being identified with a specific 'known' wireless device.

Referring to FIG. 2, a GPS receiver 250 can be included in the in-vehicle device 120 in embodiments of the present invention. The GPS receiver 250 receives control data from and sends received GPS location data to the processor and memory module 230 providing the capability of determining the vehicle location. Because the OBDII interface 210 provides a constant supply of 12 Volt DC power, even when the vehicle is off, the GPS location service can remain active with the vehicle turned off as desired, for example in an emergency, at least for some period of time. Additionally, using the power from the OBDII interface 210 makes it is easy to determine if the in-vehicle device 120 is unplugged or disabled. An integrated battery backup 260 can be integrated into the in-vehicle device 120 such that the logging of vehicle location and in-vehicle wireless device activity remains in effect, even if a recalcitrant vehicle operator unplugs the device.

Referring to FIG. 2, the local interface 270, for example a USB port, a removable memory card, a wireless or wired interface, or some other local data file transfer means, provides for post-vehicle-operation transfer of data 160 to the system user's computer 150 with the local IMS software, which may be a hand-held, laptop or desktop computer.

FIG. 2 also shows a speaker/microphone 280 in the in-vehicle device 120 that can be used, for example, to provide the vehicle operator audible warnings and/or questions and to record the operator's spoken answers. When in-vehicle wireless RF transmissions are detected, the microphone 280 and processor and memory module 230 can provide a voice activated audio recording function and log the recordings with time tags to device memory. Since the wireless device activity detections are also logged with time tags, subsequent analysis can associate individual voices, i.e., individuals, with the potentially unsafe wireless device use. For example, users may require vehicle operators to submit certain voice audio samples for use within the information management system, or IMS. The IMS could then utilize commercially available voice comparison technologies to determine if the voice in the pre-recorded sample matches that captured by the in-vehicle device. Conversely, the absence of logged voice recordings during a burst RF transmission from a wireless device is consistent with the use of the phone for texting or other data services.

Figure 3:
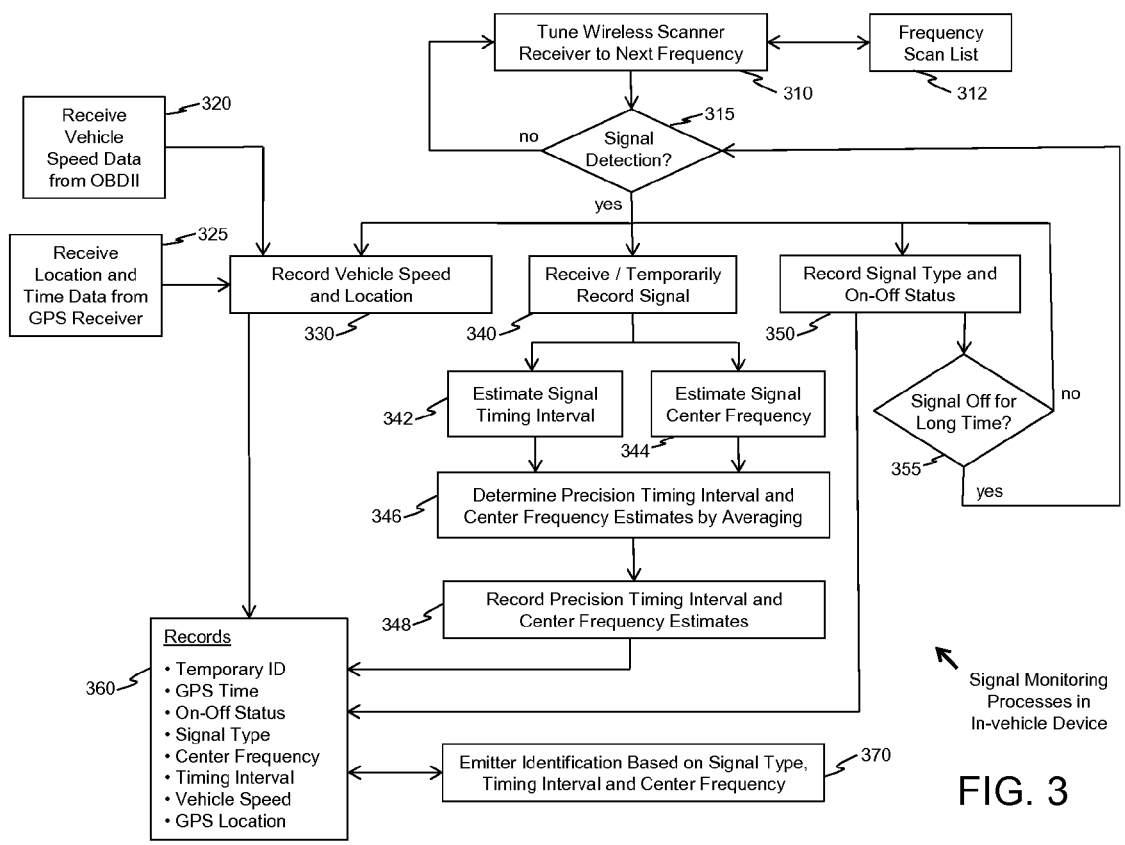
FIG. 3 depicts a reference example logic flow diagram of certain signal monitoring processes that are performed by an implementation of the in-vehicle device of the present invention.

FIG. 3 shows an example logic flow diagram of certain signal monitoring processes that are performed by an example implementation of the in-vehicle device of the present invention. Process module 310 tunes the wireless scanner receiver to a frequency that may have wireless transmissions of interest, i.e., wireless transmissions from devices that are potentially being used by the vehicle occupants. If a signal is not detected, logic flow 315 proceeds back to process module 310 which tunes the wireless scanner receiver to the next frequency in a frequency scan list 312, the list being based on the general geographical area and country location of the vehicle. If a wireless signal is detected, the logic flow 315 activates process modules 330, 340 and 350. Process module 330 records the vehicle speed data received from the OBDII port 320 and location and time data received from the GPS receiver 325. Process module 340 receives the wireless signal and temporarily records it for signal parameter estimation, to be described below. Process module 350 records the signal type, or equivalently the signal mode, e.g., GPS, CDMA, etc. and also records the On and Off status of the usually multiple signal transmissions. If the detected signal is Off for a pre-set long time, for example 1 minute, the logic flow 355 returns to 315 and 310 which then tunes the wireless scanner receiver to the next frequency in the scan list 312. If the detected signal is not Off for that long, logic flow 355 returns to process module 350 which continues to record the signal type and On-Off status.

Continuing to refer to FIG. 3, the recorded signal from process module 340 is used to estimate a signal timing interval 342 and a signal center frequency 344. These raw estimates are averaged to form precision estimates of the timing interval and center frequency 346 and recorded 348. The records of the signal detections 360 include a temporary ID, the GPS time, the On-Off status, the signal type, the precision center frequency and timing interval parameters and the vehicle speed and the GPS location. An emitter identification process 370 examines the signal detection records to look for an exact match of signal type and a statistical match of each of the precision frequency and timing interval parameters. A statistical match of two estimates of a parameter occurs when the difference between the two estimates is small compared to the known natural range of the parameter and, further, the errors associated with each of the two estimates are also known to be small compared to the range of the parameter. If the emitter identification process 370 detects a match between individual entries in the records 360, process 370 either links or modifies the temporary IDs in some manner that indicates that the signal detections are from the same emitter, e.g. wireless device.

Figure 4:
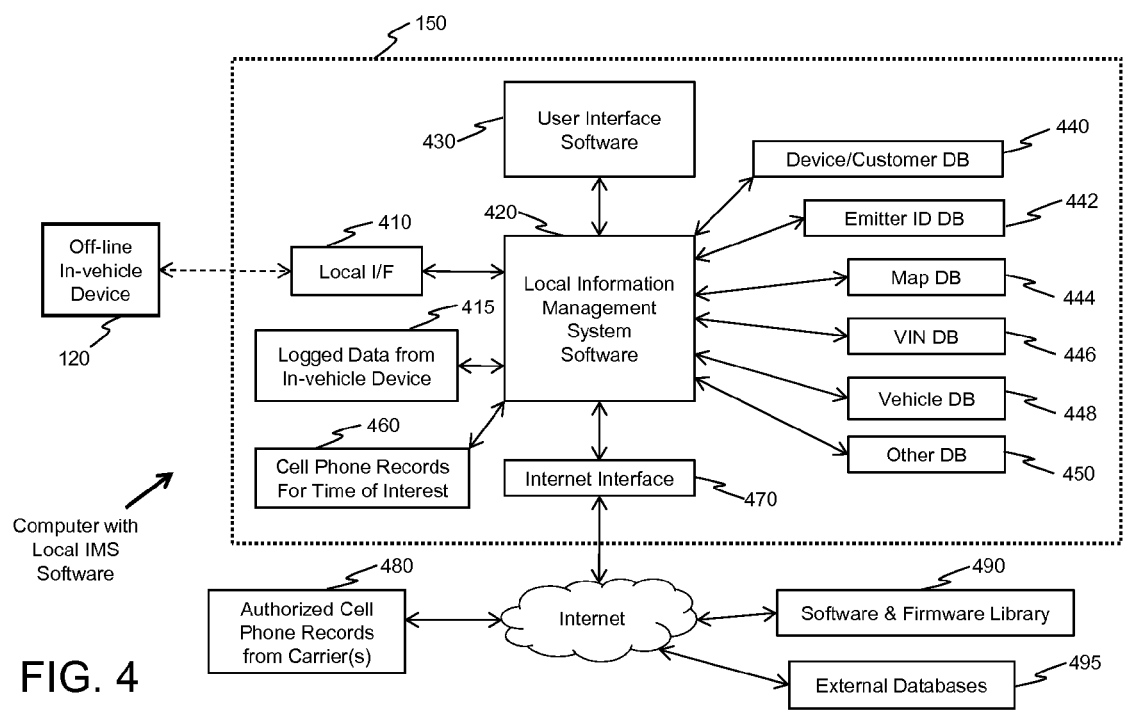
FIG. 4 depicts a reference example of a system user computer with local IMS software for an off-line embodiment of the invention.

FIG. 4 shows a block diagram of an example local embodiment of an information management system installed on the system user's computer 150. The post-vehicle-operation transfer of the logged data between the in-vehicle device 120 and the system user's computer is through a local interface 410, for example a USB port, a removable memory card, a wireless or wired interface, or some other local data file transfer means. The logged in-vehicle data 415 includes, for example, the vehicle's VIN, speed, engine RPM, airbag deployment, GPS location and the in-vehicle wireless device activity data, 360 in FIG. 3. The logged in-vehicle data 415 may also include audio data records obtained during the periods of wireless device activity. The local information management system software 420 correlates the logged data 415 with mapping, VIN, vehicle layout, wireless device, driver, other databases, 440 to 450, and, as authorized, cellphone records for the driver, 460. For example, the retrieved VIN can be decoded using a VIN database to retrieve specific vehicle characteristics such as make, model, year, color and other vehicles parameters. The times during which in-vehicle wireless activity was detected can be cross referenced with the vehicle's GPS derived location, speed, and other use data during the corresponding times. Furthermore, the times during which in-vehicle wireless activity was detected can be cross referenced with the operator's cellphone billing records to determine if a call, message, or other activity occurred on that particular device during the period of identified in-vehicle wireless activity. This provides detailed and comprehensive information about potentially unsafe wireless device use to the system user. Such information is reviewed by the system user via the IMS user interface software 430. The Internet interface 470 of the user's computer is used to download authorized cellphone records 480 from the wireless carrier as well as in-vehicle device firmware and software updates 490 and data base updates 495.

Figure 5A:
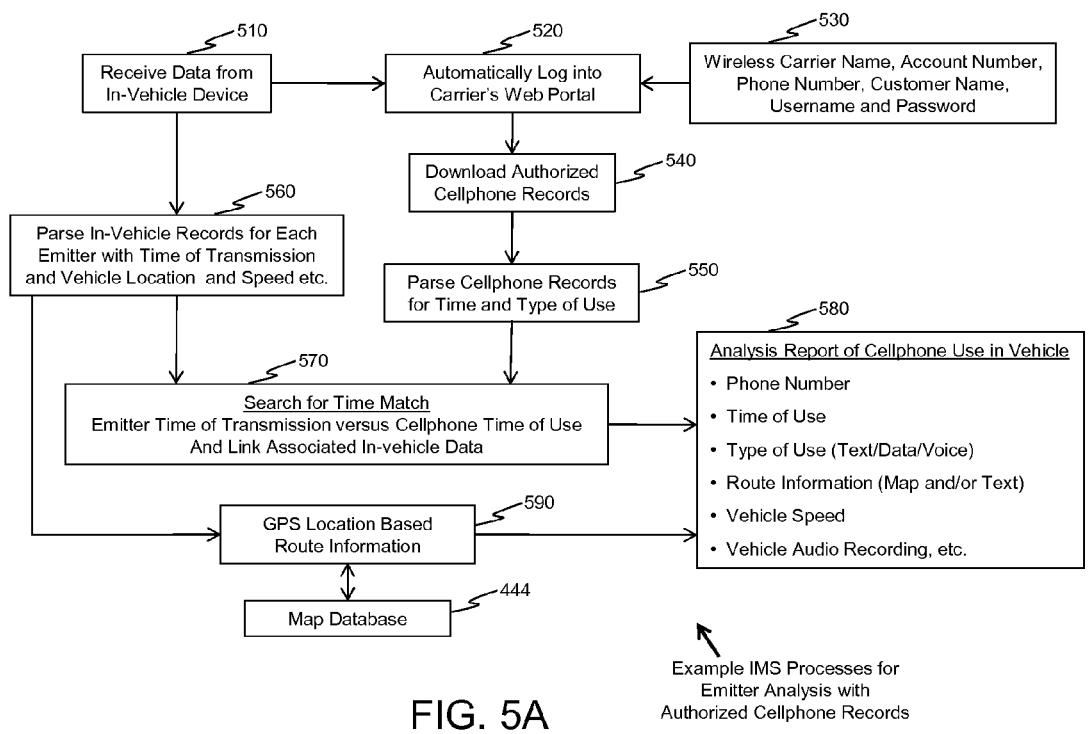
FIG. 5A depicts a reference example logic flow diagram of cellphone record analysis automated software processes that are performed by an implementation of the IMS software of the present invention.

FIG. 5A shows an example logic flow diagram of cellphone record analysis automated software processes that are performed by an example implementation of the information management system of the present invention. The cellphone record analysis automated software processes depicted in FIG. 5A are applicable to the use-cases of the system of the present invention in which the system user has authorized access to the cellphone records of the transport/vehicle operator. For example, a system user parent concerned about unsafe wireless device use of their vehicle-operating child can readily obtain online access to their child's cellphone billing records through the carrier's website 480. Most wireless carriers allow customers to download highly detailed usage records in near real-time.

Referring to the cellphone record analysis automated software processes in FIG. 5A, the information management process module 510 receives the data from the in-vehicle device and initiates process module 520 which automatically logs into the web portal of the wireless carrier using the vehicle operator's wireless account detail 530 as provided by the system user, for example carrier name, account number, phone number, customer name, username, and password. Process module 540 then downloads the cellphone records 460 and process module 550 parses these records to extract the time and type of cellphone use. Process module 560 parses the in-vehicle records for each emitter—including the time of transmission and the associated vehicle location, speed and other data recorded by the device 120. A search for matches in the emitter time of transmission and the cellphone time of use is performed by process module 570 and the associated vehicle data is linked when the times match. Process module 590 receives the GPS location data from 560 and provides route information in the form of a map and or text using the map database 444. Process module 580 then reports the results of the analysis of cellphone use in the vehicle according to cellphone number, time of use, type of use (text, non-text data or voice) as well as route information, speed and other recorded data, for example in-vehicle audio recordings. The report achieves the goals of the time match analysis, which are to identify: 1) the specific wireless device that was in use at the time the in-vehicle device 120 detected in-vehicle wireless device activities and 2) the specific use-activities of the detected wireless device, such as texting or talking.

Figure 5B:
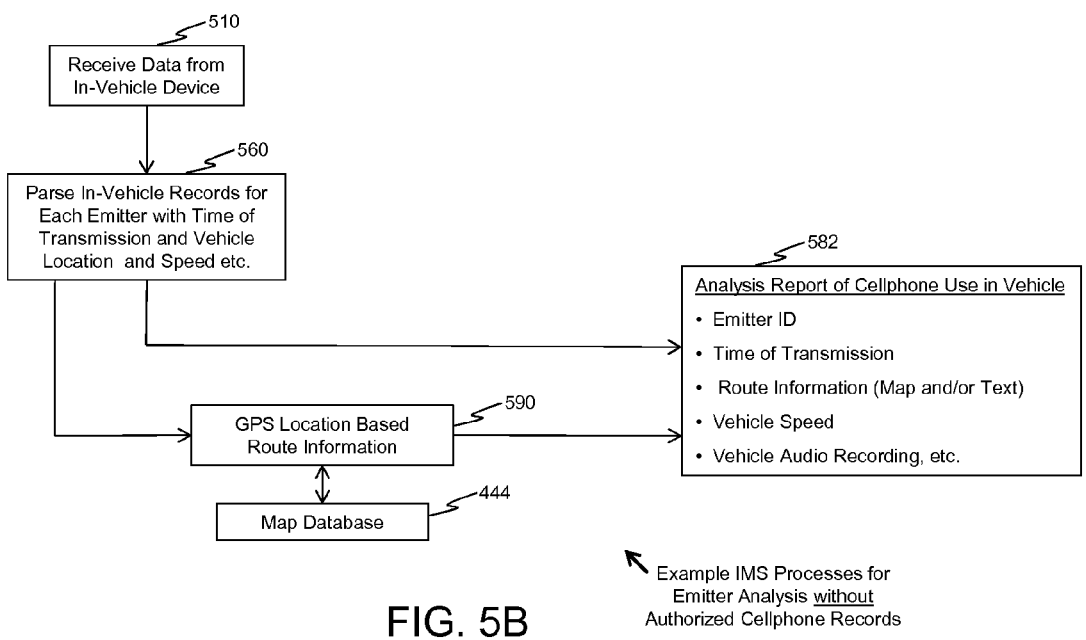
FIG. 5B depicts a reference example logic flow diagram of the emitter record analysis software processes in an implementation of the IMS for the use-case that does not have authorized cellphone.

Note however, access to the cellphone records 480 is not required for the system and method of the present invention to safely and effectively discourage unsafe wireless device use by the operator of a vehicle. For example in a commercial trucking fleet use-case, the fleet policy is typically "no cellphone use in the vehicle while the engine is running, period" and the fleet supervisor does not need to determine whose cellphone was detected. Consequently, the information management system 420 does not require access to the cellphone records 480. In this use-case it is only necessary that the in-vehicle device 120 reliably detects the activity of an in-vehicle wireless device 130 while the engine is running FIG. 5B shows an example of the logic flow diagram of the emitter record analysis software processes in an implementation of the IMS for the use-case that does not have authorized cellphone records. The process module 582 reports the results of the analysis of cellphone use in the vehicle according to emitter ID, time of use, as well as route information, vehicle speed and other recorded data, for example in-vehicle audio recordings.

Figure 6:
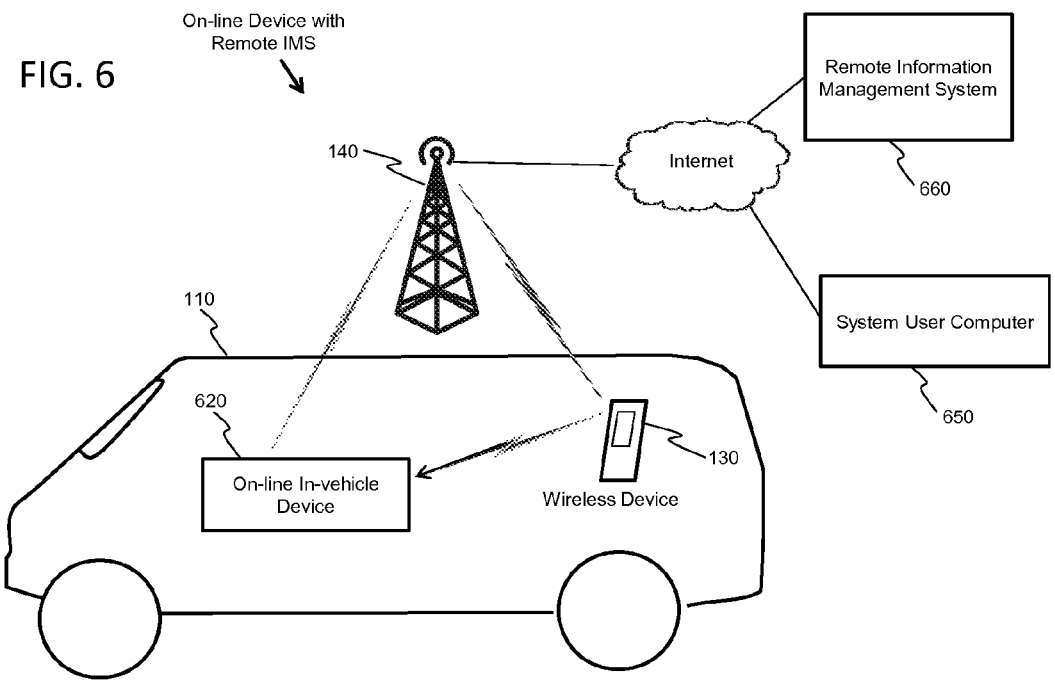
FIG. 6 depicts a diagram of an on-line device with remote IMS embodiment of the invention to discourage unsafe wireless device use by the operator of a vehicle.

FIG. 6 shows a diagram of another embodiment of the invention in which a vehicle 110 contains an in-vehicle device 620 and a wireless device 130 that is of interest as a potential distraction to the vehicle operator. In this on-line system embodiment, the in-vehicle device 620 contains a cellular modem that provides access to the Internet via a wireless service provider. This Internet access via a wireless service provider's network allows the in-vehicle device 620 to periodically or continuously transfer time-stamped logged data to a remote information management system 660. With Internet access, the system user may simply open a web browser on a computer or web-enabled application 650 to review the analysis reports and on-line logged data in detail.

Figure 7:
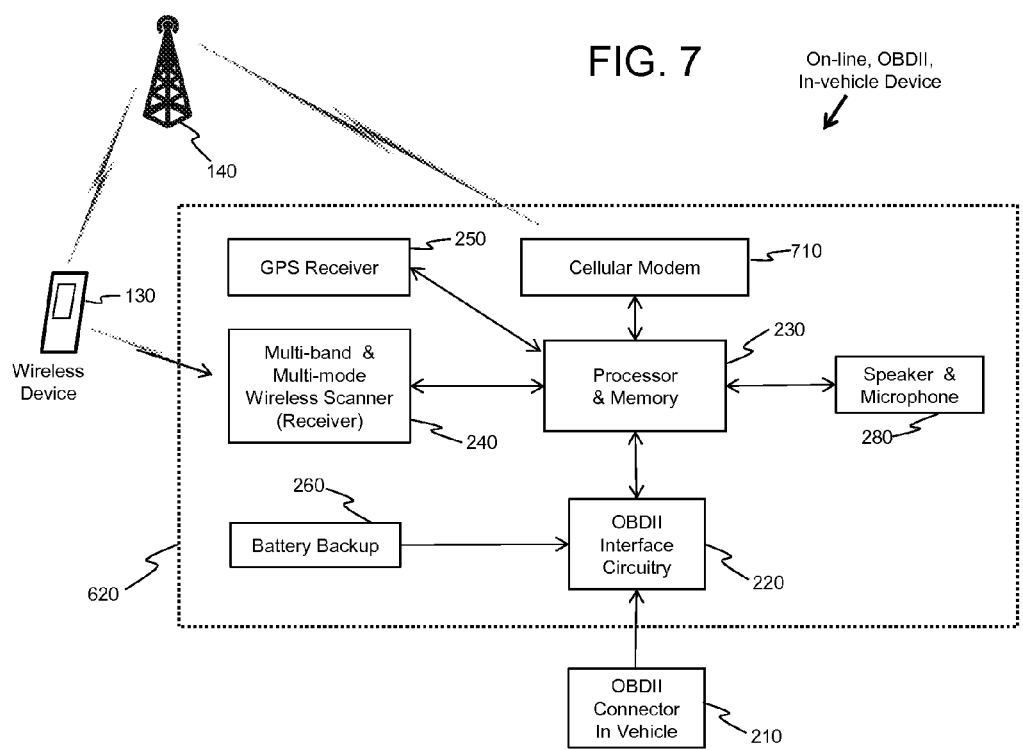
FIG. 7 depicts a reference example of an in-vehicle device for an OBDII, on-line embodiment of the invention.

FIG. 7 is an example on-line, OBDII in-vehicle device embodiment for a remote information management system embodiment that shows a cellular modem 710 for periodic or continuous transfer of logged data from the in-vehicle device 620 to the remote information management system 660 via a wireless service provider's network 140. The cellular modem 710 may be either a cellular data-only modem or a cellular phone modem that includes a data service along with a voice service. The logged data is the same as for the above in-vehicle device 120 shown in FIG. 2 for an off-line system embodiment; preferably including GPS location and vehicle parameters, such as VIN, speed, engine RPM, and airbag deployment, in addition to the in-vehicle wireless device activity data. Modules 220, 230, 240, 250, 260 and 280 in the in-vehicle device 620 are also the same in substance and operation as described above for the in-vehicle device 120 for the off-line system in FIG. 2.

FIG. 8 shows a block diagram that illustrates an information management system 660 and several telecommunication links that are associated with an example on-line embodiment of the present invention. To support the required communications, the remote system 660 has both an Internet interface 870 and a telephone network interface 875. The Internet provides web-access for the system user's computer 650 and provides the information management system 660 communication from and to the in-vehicle device 620 and access to authorized cellphone records 880 and other on-line databases of interest, e.g. updates to databases 840 to 850. The information management system 660 uses the telephone network for short messaging and voice communications to the system user's phone 890. For embodiments of the in-vehicle device 620 that use a wireless phone implementation of the cellular modem module 710 in FIG. 7, the information management system 660 may also use the telephone network for SMS messages and voice communications with the in-vehicle device 620 and the vehicle driver in addition to receiving data from the on-line in-vehicle device 620.

Referring to FIG. 8, the remote information management system software 820 analyzes the uploaded logged data from the in-vehicle device 620 to provide information about potentially unsafe wireless device use; the analysis being materially the same as described above for the local information management system software 420. The logged data is correlated with the databases, 840 to 850, and any authorized cellphone records for the driver, 880. The analysis results provide both summary and detailed reports containing information about any potentially unsafe wireless device use. The occurrence of unsafe wireless device use can be reported via the telephone network in the form of timely notifications or alarms to the system user. The system user may then review the reports in more detail via a web browser or network-enabled application 650. Note that since the remote information management system 660 serves a large number of in-vehicle devices 620, the remote system 660 maintains a device manager 860 to keep track of the devices and shares data storage space 830 between devices. The remote system 660 also maintains the software and firmware library 865 for download support of the in-vehicle devices 620.

Note that The VIN data retrieved by the OBDII connected in-vehicle device 620 enables the remote information management system 660 to determine a great deal of information regarding the installed vehicle. This information enables the information management system to largely self-configure by automatically determining vehicle make, model, year, and other configuration parameters. The system would monitor for any change in VIN, such that a transfer to a different vehicle is immediately identified.

FIG. 9 is an example in-vehicle device embodiment that shows additional sensor modules that may be included in preferred embodiments to better characterize the potentially unsafe wireless device use. Although the embodiment shown is an OBDII device for an on-line system, the additional sensors will work equally well for non-OBDII device and off-line system embodiments. The multiple antennas 910 together with a multiple RF channel upgrade of the scanner module 240 can provide directional data to the emitter identification in the processor and memory module 230. In comparing the directional data with calibrated data of the same type, the emitter identification function may be able to determine which zone of the vehicle the wireless emission is originating from, for example, the zone of the driver's seat versus the zone of the front passenger seat. Furthermore, when in-vehicle wireless RF transmissions are detected, a camera or video recorder 920, motion detectors 930, or infrared detectors 940 that are communicably connected to the processor and memory module 230 can provide emitter detection activated sensor recording functions and log the recordings with time tags. Since the wireless emitter detections are also logged with time tags, subsequent analysis can associate this additional sensory data with the potentially unsafe wireless device use to better identify the offender. The sensors themselves can be remotely placed relative to the in-vehicle monitoring device and be communicably connected to the device by means of wired or wireless data links.

In some embodiments of the present invention, non-OBDII compliant automobiles are upgraded with the in-vehicle device. Many pre-1996 passenger vehicles, as well as most heavy trucks, busses, trains, boats, and other vehicles do not incorporate an OBDII interface. In these instances, one preferred installation of the in-vehicle device involves the use of an alternative removable connecting cable that uses wire termination, or another connector instead of a standard 16-pin (2×8) J1962 connector, to minimize changes to the off-line and on-line versions of the OBDII in-vehicle devices, 120 and 620 as diagrammed in FIGS. 2 and 7, respectively. Although some vehicle-derived inputs, such as VIN and speed, may be absent in this embodiment; such losses may be partially overcome by other factors. For example: 1) user's ability to determine if the in-vehicle device was unplugged and moved to another vehicle through VIN continuity would be overcome by the increased difficulty in removing and reinstalling a non-OBDII-interface system and 2) loss of speed information from the vehicle could be overcome by reliance on GPS location information. Other than the additional installation and configuration effort, this embodiment would be materially similar to the above upgrade of an OBDII-compliant automobile embodiment.

In the example on-line embodiments of the present invention, the in-vehicle device 620 is equipped with a network-enabled cellular modem 710 that allows for real-time communication with the remote information management system 660, i.e., continuous uploading of logged data instead of just periodic uploading. If the system user account is configured for "real-time tracking", the remote information management system 660 can provide real-time tracking of vehicle location, vehicle operational status and wireless device activity and in turn provide the system user with real-time alerts and monitoring capabilities. The system users can also have the options of receiving real-time email, text, or voice alerts per their account configuration.

For informational purposes, note that the OBDII/on-line embodiments of the present invention provide many desirable vehicle monitoring and communication capabilities in addition to the above discussed detecting, identifying, reporting and discouraging unsafe wireless device use. The additional vehicle monitoring capabilities include the detection and logging of: 1) seat-belt use; 2) 'check engine light' notification; 3) OBDII fault codes (with an explanation of meaning); and 4) vehicle battery health reports. The additional vehicle communication capabilities include: 1) two-way data and voice communications with the vehicle; 2) IMS generated in-vehicle alarm or buzzer when certain policies are violated (speeding, wireless device use, etc); 3) real-time arrival/departure notifications; 4) accident notifications; and the ability to provide a wireless-to-WiFi hotspot.

Although embodiments of the present invention have been illustrated in the accompanied figures and described in the foregoing detailed description, it will be understood that the invention is not limited to the embodiments disclosed, but is capable of numerous rearrangements, additions, modifications, and substitutions without departing from the spirit of the invention as set forth and defined by the following claims. For example, the in-vehicle devices may rely on network triangulation data for location estimation instead of using a GPS receiver device or the in-vehicle devices may use a Bluetooth connected wireless data service for on-line communications instead of using the cellular modem as discussed above. Further, although depicted in a particular manner, more than one of the depicted or described modules can be utilized in the present invention and functionality provided by one module can be fully and/or partially provided by another one of the modules.

What is claimed is:

1. A method, comprising:
   tuning a scanner receiver to a frequency;
   detecting whether at least one signal is transmitted at the frequency;
   activating a processing module to record the at least one signal and at least one vehicle operating condition;
   estimating a signal timing interval and a center frequency; and
   determining whether the at least one signal matches a pre-stored signal of a signal detection record based on the timing interval and the center frequency.

2. The method of claim 1, wherein the frequency is used by at least one in-vehicle wireless communication device.

3. The method of claim 1, further comprising:
   re-tuning the scanner receiver to a next frequency of a frequency scan list that is different from the frequency if no signal is being transmitted at the frequency, the frequency scan list being based on a current geographical area location of the vehicle; and
   detecting at least one signal being transmitted at the next frequency.

4. The method of claim 1, wherein recording the at least one vehicle operating condition comprises recording a vehicle speed received from an on-board diagnostics version 2.0 (OBDII) interface of the vehicle and a vehicle location and time the data was recorded.

5. The method of claim 1, wherein recording at least one signal further comprises recording a signal type, a signal protocol, and an on or off status of multiple signal transmissions associated with the at least one signal, and wherein if the recorded at least one signal is determined to be off for a pre-set time duration then re-tuning the scanner receiver to a next frequency of a frequency scan list that is different from the frequency.

6. The method of claim 1:
   wherein estimating the signal timing interval and the center frequency is based on the recorded at least one signal; and
   wherein determining whether the at least one signal matches a pre-stored signal of a signal detection record further comprises identifying a statistical match based on a difference between the timing interval and the center frequency of the at least one signal and the timing interval and center frequency of the pre-stored signal of the signal detection record.

7. The method of claim 6, wherein determining a statistical match further comprises linking at least one signal identifier of the at least one recorded signal to at least one signal identifier of the additionally recorded signal to indicate that the at least one recorded signal and the at least one additionally recorded signal are detected from a same in-vehicle wireless communication device.

8. An apparatus, comprising:
a memory;
a scanner receiver configured to be tuned to a frequency;
a detector configured to detect whether at least one signal is transmitted at the frequency; and
a processor configured to:
- activate a processing module to record the at least one signal and at least one vehicle operating condition,
- estimate a signal timing interval and a center frequency, and
- determine whether the at least one signal matches a pre-stored signal of a signal detection record based on the timing interval and the center frequency.

9. The apparatus of claim 8, wherein the frequency is used by at least one in-vehicle wireless communication device.

10. The apparatus of claim 8, wherein the scanner receiver is re-tuned to a next frequency of a frequency scan list that is different from the frequency if no signal is being transmitted at the frequency, the frequency scan list being based on a current geographical area location of the vehicle, and wherein the detector is configured to detect at least one signal being transmitted at the next frequency.

11. The apparatus of claim 8, wherein the at least one vehicle operating condition is recorded to include a vehicle speed received from an on-board diagnostics version 2.0 (OBDII) interface of the vehicle and a vehicle location and time the data was recorded.

12. The apparatus of claim 8, wherein the at least one signal is recorded to include a signal type, a signal protocol, and an on or off status of multiple signal transmissions associated with the at least one signal, and wherein if the recorded at least one signal is determined to be off for a pre-set time duration then re-tuning the scanner receiver to a next frequency of a frequency scan list that is different from the frequency.

13. The apparatus of claim 8:
wherein the signal timing interval and the center frequency is estimated based on the recorded at least one signal; and
wherein the at least one signal is determined to match a pre-stored signal of a signal detection record by identifying a statistical match based on a difference between the timing interval and the center frequency of the at least one signal and the timing interval and center frequency of the pre-stored signal of the signal detection record.

14. The apparatus of claim 13, wherein a statistical match is determined by linking at least one signal identifier of the at least one recorded signal to at least one signal identifier of the additionally recorded signal to indicate that the at least one recorded signal and the at least one additionally recorded signal are detected from a same in-vehicle wireless communication device.

15. A non-transitory computer readable storage medium configured to store instructions that when executed cause a processor to perform:
tuning a scanner receiver to a frequency;
detecting whether at least one signal is transmitted at the frequency;
activating a processing module to record the at least one signal and at least one vehicle operating condition;
estimating a signal timing interval and a center frequency; and
determining whether the at least one signal matches a pre-stored signal of a signal detection record based on the timing interval and the center frequency.

16. The non-transitory computer readable storage medium of claim 15, wherein the frequency is used by at least one in-vehicle wireless communication device.

17. The non-transitory computer readable storage medium of claim 15, wherein the processor is further configured to perform:
re-tuning the scanner receiver to a next frequency of a frequency scan list that is different from the frequency if no signal is being transmitted at the frequency, the frequency scan list being based on a current geographical area location of the vehicle; and
detecting at least one signal being transmitted at the next frequency.

18. The non-transitory computer readable storage medium of claim 15, wherein recording the at least one vehicle operating condition comprises recording a vehicle speed received from an on-board diagnostics version 2.0 (OBDII) interface of the vehicle and a vehicle location and time the data was recorded.

19. The non-transitory computer readable storage medium of claim 15, wherein recording at least one signal further comprises recording a signal type, a signal protocol, and an on or off status of multiple signal transmissions associated with the at least one signal, and wherein if the recorded at least one signal is determined to be off for a pre-set time duration then re-tuning the scanner receiver to a next frequency of a frequency scan list that is different from the frequency.

20. The non-transitory computer readable storage medium of claim 15:
wherein estimating the signal timing interval and the center frequency is based on the recorded at least one signal; and
wherein determining whether the at least one signal matches a pre-stored signal of a signal detection record further comprises identifying a statistical match based on a difference between the timing interval and the center frequency of the at least one signal and the timing interval and center frequency of the pre-stored signal of the signal detection record.

* * * * *